(12) United States Patent
Yao

(10) Patent No.: US 6,385,677 B1
(45) Date of Patent: May 7, 2002

(54) DUAL INTERFACE MEMORY CARD AND ADAPTER MODULE FOR THE SAME

(76) Inventor: Li-Ho Yao, No. 99-4, Tungan St., Taipei (TW)

( * ) Notice: Subject to any disclaimer, the term of this patent is extended or adjusted under 35 U.S.C. 154(b) by 0 days.

(21) Appl. No.: 09/449,961

(22) Filed: Nov. 26, 1999

(51) Int. Cl.$^7$ .............................................. G06F 13/00
(52) U.S. Cl. ...................... 710/102; 710/13; 710/101; 710/129; 711/115; 711/2
(58) Field of Search .......................... 710/13, 101, 102, 710/128, 129; 711/2, 115

(56) References Cited

U.S. PATENT DOCUMENTS

| | | | | |
|---|---|---|---|---|
| 5,400,216 A | * | 3/1995 | Tsai ............................. | 361/684 |
| 5,421,737 A | * | 6/1995 | Chen et al. ................... | 439/157 |
| 5,604,917 A | * | 2/1997 | Saito et al. ................... | 345/531 |
| 5,682,548 A | * | 10/1997 | Moore ........................... | 710/3 |
| 5,747,735 A | * | 5/1998 | Chang et al. .................. | 174/51 |
| 5,752,857 A | * | 5/1998 | Knights ......................... | 235/380 |
| 5,820,414 A | * | 10/1998 | Omori ............................ | 439/638 |
| 5,835,931 A | * | 11/1998 | Brandt et al. ................... | 710/13 |
| 5,846,092 A | * | 12/1998 | Feldman et al. ............... | 361/737 |
| 5,890,015 A | * | 3/1999 | Garney et al. .................. | 710/106 |
| 6,129,572 A | * | 10/2000 | Feldman et al. ............... | 439/325 |
| 6,185,641 B1 | * | 2/2001 | Dunnihoo ....................... | 370/402 |
| 6,199,120 B1 | * | 3/2001 | Tanaka .......................... | 710/10 |
| 6,220,882 B1 | * | 4/2001 | Simmel et al. ................. | 439/326 |
| 6,308,215 B1 | * | 10/2001 | Kolbet et al. .................. | 326/21 |

* cited by examiner

Primary Examiner—B. James Peikari
(74) Attorney, Agent, or Firm—Rosenberg, Klein & Lee

(57) ABSTRACT

A dual interface memory card and an adapter module for the memory card are disclosed to convenient transfer data between the memory card and a computer. The dual interface memory card has a memory unit and a micro control unit connected to the memory unit. The micro control unit includes a USB interface for connecting to a computer whereby the computer is able to read data from and write data to the memory unit, and a host interface for connecting to an electronic product which has the memory card installed therein such that data output from the electronic product can be stored in the memory unit. The adapter module is provided to conveniently connect the dual interface memory card to the computer.

7 Claims, 7 Drawing Sheets

DUAL INTERFACE MEMORY CARD AND ADAPTER MODULE FOR THE SAME

BACKGROUND OF THE INVENTION

1. Field of the Invention

The present invention relates to a dual interface memory card and an adapter module; more particularly, the present invention relates to a memory card with two kinds of interfaces to communicate with an electronic product and a computer, respectively, for convenient data access, and an adapter module for such a dual interface memory card.

2. Description of Related Art

The progress of the computer technology has made the life of human beings easier. Many computer products, such as electronic dictionaries, electronic translators, digital cameras, etc., have been frequently used in our everyday life. The use of these computer products generally needs connections to be established to a computer for data access. Taking the digital camera as an example, the image that is captured by the digital camera is transformed into digital data for being stored in a memory card therein, instead of being formed on a film in a traditional camera. The digital data is then transferred to a computer for being stored such that the computer can display or print the captured image.

Because of the advanced electronic technology, the memory card is getting smaller in dimension while being provided with even larger capacity. Various kinds of well known memory cards, such as the STONE card, Smart Media card, MMC card, Memory Stick card and Compact Flash card, have been provided with the advantages of small dimension and large capacity, generally, more than several mega-bytes. The use of such memory cards enables the miniaturization of electronic products. However, they do not have standard interfaces for communicating with a computer. In order to transfer data between a computer and a memory card, the following methods are employed:

1. Using a card reader: A card reader is provided to connect to the interface port of a computer such that the computer is able to read data from a memory card that is inserted in the card reader. As different memory cards have different interfaces, a dedicated card reader must be provided for a specific memory card.

2. Using a transform disk: A transform disk that has the same physical specification as the 3.5-inch disk is provided with a slot for receiving a memory card, such that a computer can write data to or read data from the memory card when the transform disk in inserted into the disk drive of the computer.

There are some problems encountered in using the aforementioned methods. For example, most of the card readers can not write data to the memory cards, and the data access speed is slow when the transform disk and disk drive are used for transferring data between a memory card and a computer. Furthermore, the use of transform disk and disk drive to read or write data is likely to result in mechanical disorders because data is accessed by physical contact. Therefore, there is a need for the above memory cards to be improved to mitigate and/or obviate the problems.

SUMMARY OF THE INVENTION

The object of the present invention is to provide a dual interface memory card and an adapter module for the memory card to conveniently transfer data between the memory card and a computer without the risk of mechanical disorders.

In accordance with one aspect of the present invention, the dual interface memory card is provided with a memory unit and a micro control unit connected to the memory unit. The micro control unit includes a USB interface for connecting to a computer whereby the computer is able to read data from and write data to the memory unit, and a host interface for connecting to an electronic product which has the memory card installed therein such that data output from the electronic product can be stored in the memory unit.

In accordance with another aspect of the present invention, the adapter module is provided to have a housing, and a USB connector and a terminal seat contained in the housing. The housing defines a memory card slot for receiving the dual interface memory card. The USB connector is provided for being inserted into a USB slot of a computer. The terminal seat has a plurality of connection terminals, each having one end for facing to an interface port of the memory card, and an opposite end connected to the USB connector.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
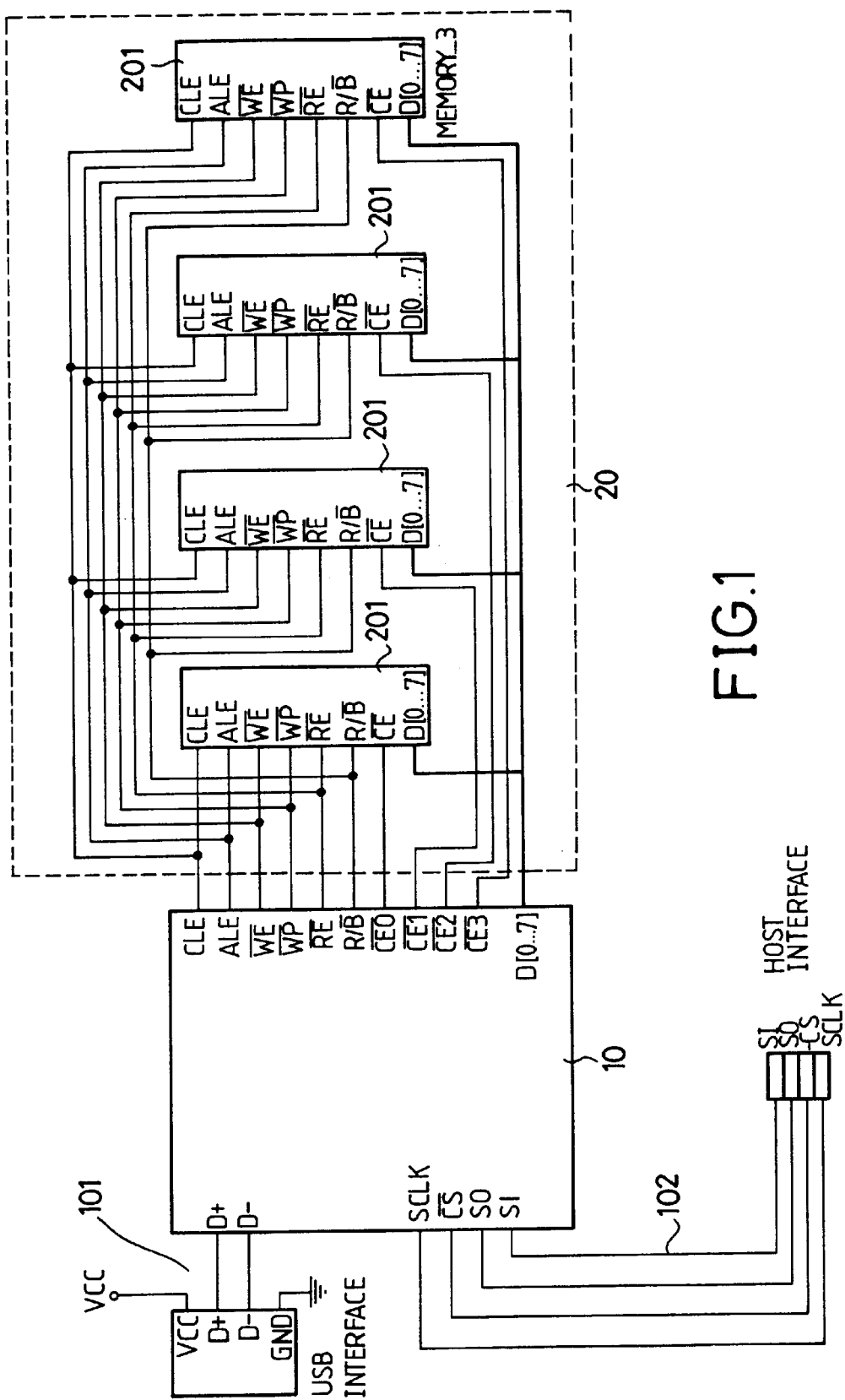
FIG. 1 is the circuit diagram of a dual interface memory card in accordance with the present invention.

FIG. 1 shows the circuit structure of a dual interface memory card in accordance with the present invention, which includes a micro control unit (10) and a memory unit (20). The micro control unit (10) has two I/O interfaces (101,102), wherein the first one (101) is used for connecting to a corresponding computer interface port, preferably a USB interface, and the second one (102) is provided as a host interface, preferably conforming to the known SPI specification, for connecting to an electronic product (not shown). The memory unit (20) is composed of flash memories or read only memories. In this preferred embodiment, the memory unit (20) includes a plurality of flash memory chips (201).

Figure 2:
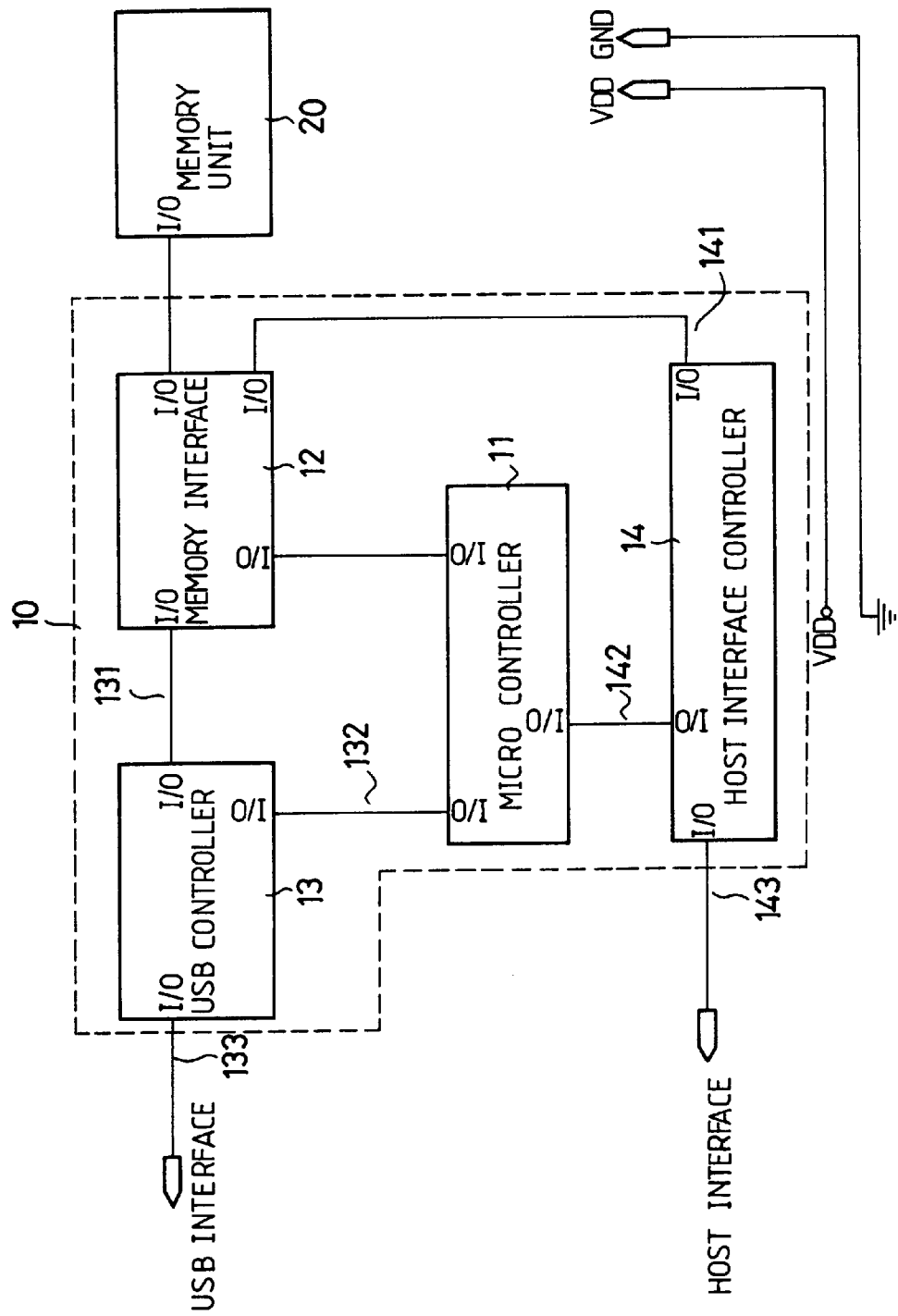
FIG. 2 is the circuit diagram of the micro control unit shown in FIG. 1.

FIG. 2 shows the circuit structure of the micro control unit (10), which includes a micro controller (11), a memory interface (12), a USB controller (13), and a host interface controller (14). The micro controller (11) is provided with associated firmware that is executed to process the data input to the micro control unit (10) or the data to be output.

The memory interface (12) is provided as a communicating interface for the memory unit (20), the micro controller (11), the USB controller (13), and the host interface controller (14).

The USB controller (13) has a first set of I/O terminals (131) for communicating with the memory unit (20) via the memory interface (12), a second set of I/O terminals (132) for connecting to the micro controller (11), and a third set of I/O terminals (133) provided as the USB interface.

The host interface controller (14) has a first set of I/O terminals (141) for communicating with the memory unit (20) via the memory interface (12), a second set of I/O terminals (142) for connecting to the micro controller (11), and a third set of I/O terminals (143) provided as the host interface.

With the circuit structure as shown in FIG. 2, the operating status of the memory card is determined by the micro controller (11). When the memory card is connected to a computer by the USB interface (101), the micro controller (11) can read data from the memory unit (20). The data is thus transferred, via the memory interface (12), to the USB controller (13), for being transformed to USB formatted data, which is then received by a computer via the USB interface port of the computer.

When the memory card is installed in an electronic product, and uses the host interface (102) for connecting to the electronic product, the data output from the electronic product is sent to the memory card via the host interface (102) for being processed by the micro controller (11) and then stored in specific locations of the memory unit (20).

Because of having both the host and USB interfaces (102,101), the memory card in accordance with the present invention not only can be installed in associated electronic products for storing data but also can transfer the stored data to a computer or receive data from the computer via the USB interface (101).

Figure 3:
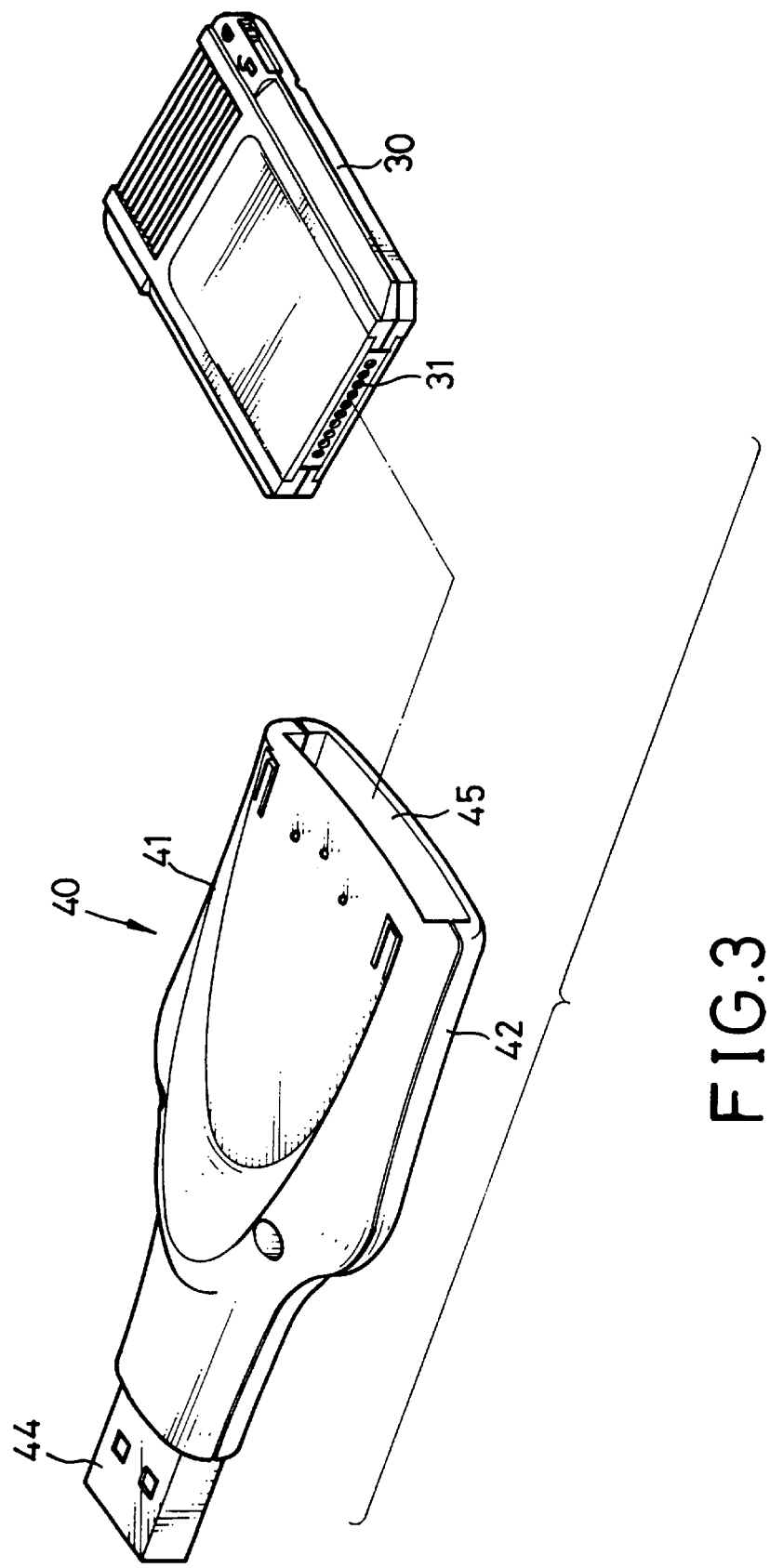
FIG. 3 is a perspective view of the memory card and an adapter module in accordance with the present invention.

A practical implementation of the memory card in accordance with the present invention and its usage is shown in FIG. 3 for illustrative purpose. It is shown that a memory card (30) is in use with an adapter module (40), wherein the memory card (30) has the aforementioned micro control unit (10) and memory unit (20). Furthermore, the front end of the memory card (30) is provided with an interface port (31) having a plurality of terminal holes. Four of the terminal holes, which are connected to the USB controller (13) of the micro control unit (10), are provided as the USB interface (101), while the others, which are connected to the host interface controller (14) of the micro control unit (10), are provided as the host interface (102). In order to connect the memory card (30) to the USB interface port of a computer, the adapter module (40) is employed, the internal structure which is shown in FIG. 4.

The adapter module (40) has an upper shell (41) and a lower shell (42) for combining with the upper shell (41) to form a housing, in which a terminal seat (43) and a USB connector (44) are provided at two opposite ends of the housing.

Figure 5:
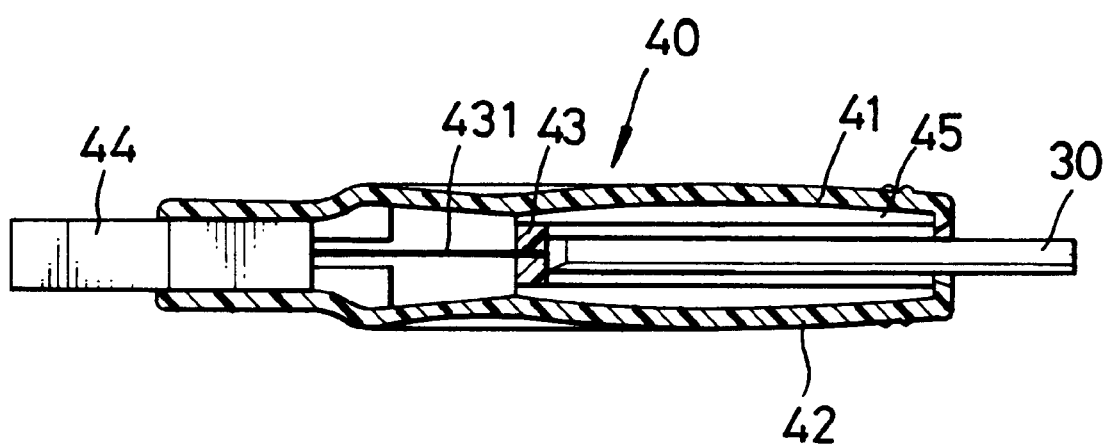
FIG. 5 is a cross sectional view of the adapter module being inserted with the dual interface memory card.

The upper shell (41) and the lower shell (42) can be secured together by screw means or other appropriate securing means. The lower shell (42) defines two recess areas (421,422) in an upper face thereof, while the upper shell (41) also defines two corresponding recess areas (not shown) in a lower face thereof facing to the two recess areas (421,422) of the lower shell (42), respectively. Therefore, the housing formed by the upper shell (41) and the lower shell (42) defines two chambers. One chamber is used to hold the terminal seat (43) and is provided as a memory card slot (45), as shown in FIG. 5, for receiving a memory card (30). The other chamber is used to hold the USB connector (44).

Figure 4:
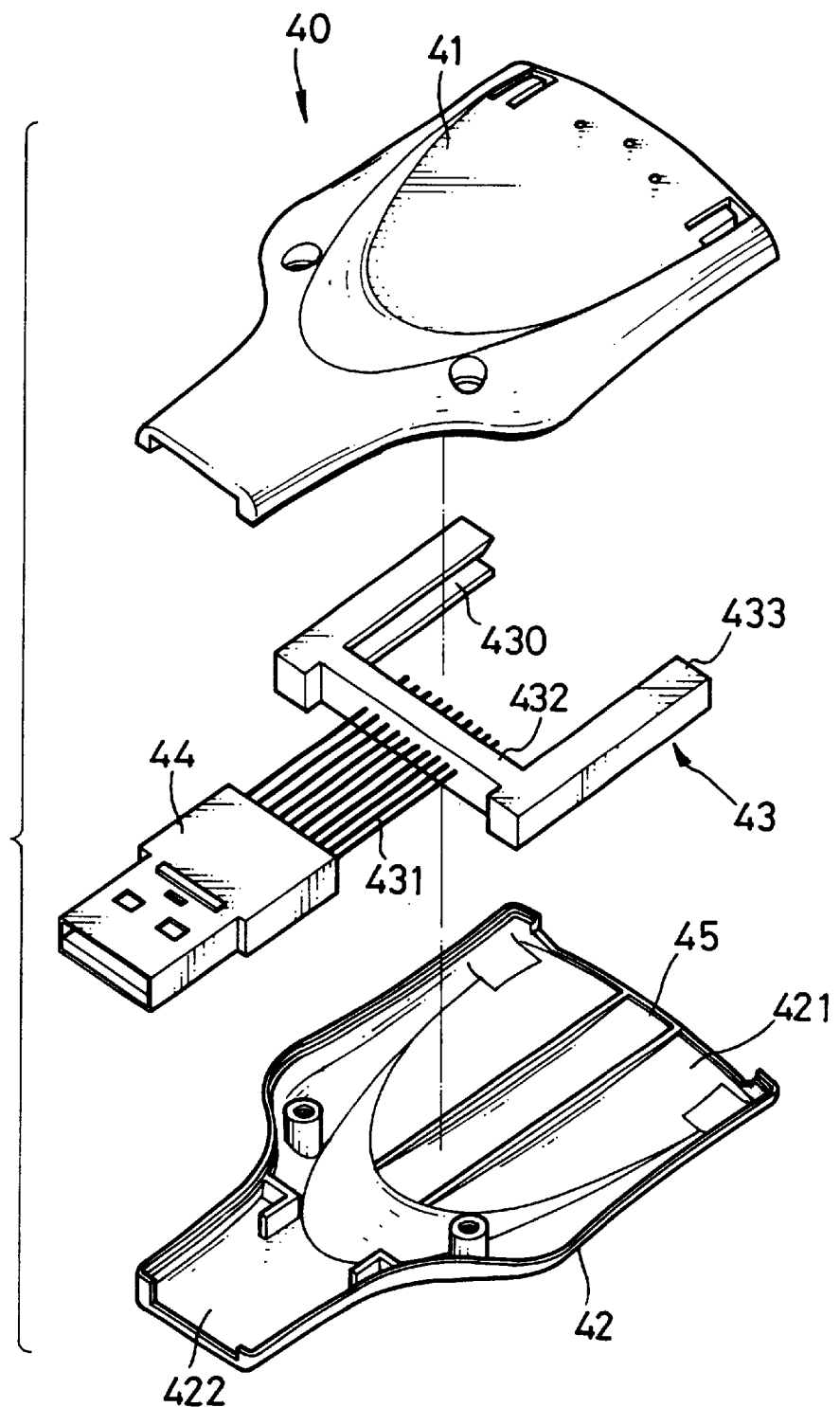
FIG. 4 is an exploded view of the adapter module in accordance with the present invention.

Still with reference to FIG. 4, the terminal seat (43) is substantially of an H-shaped body which has two parallel rims (433) and a rib (432) connected to the two rims (433). Each of the rims (433) defines a sliding slot (430) in the inner side thereof, such that the memory card (30) can smoothly slide into the terminal seat (43). A plurality of connection terminals (431) are extended through the rib (432). Each connection terminal (431) has one end for facing to the interface port (31) of the memory card (30), and another end connected to the USB connector (44). Therefore, when the memory card (30) is inserted into the adapter module (40), as shown in FIG. 5, the interface port (31) of the memory card (30) receives the connection terminals (431) of the terminal seat (43), such that the interface port (31) is electrically connected to the USB connector (44) via the plurality of connection terminals (431).

Figure 6:
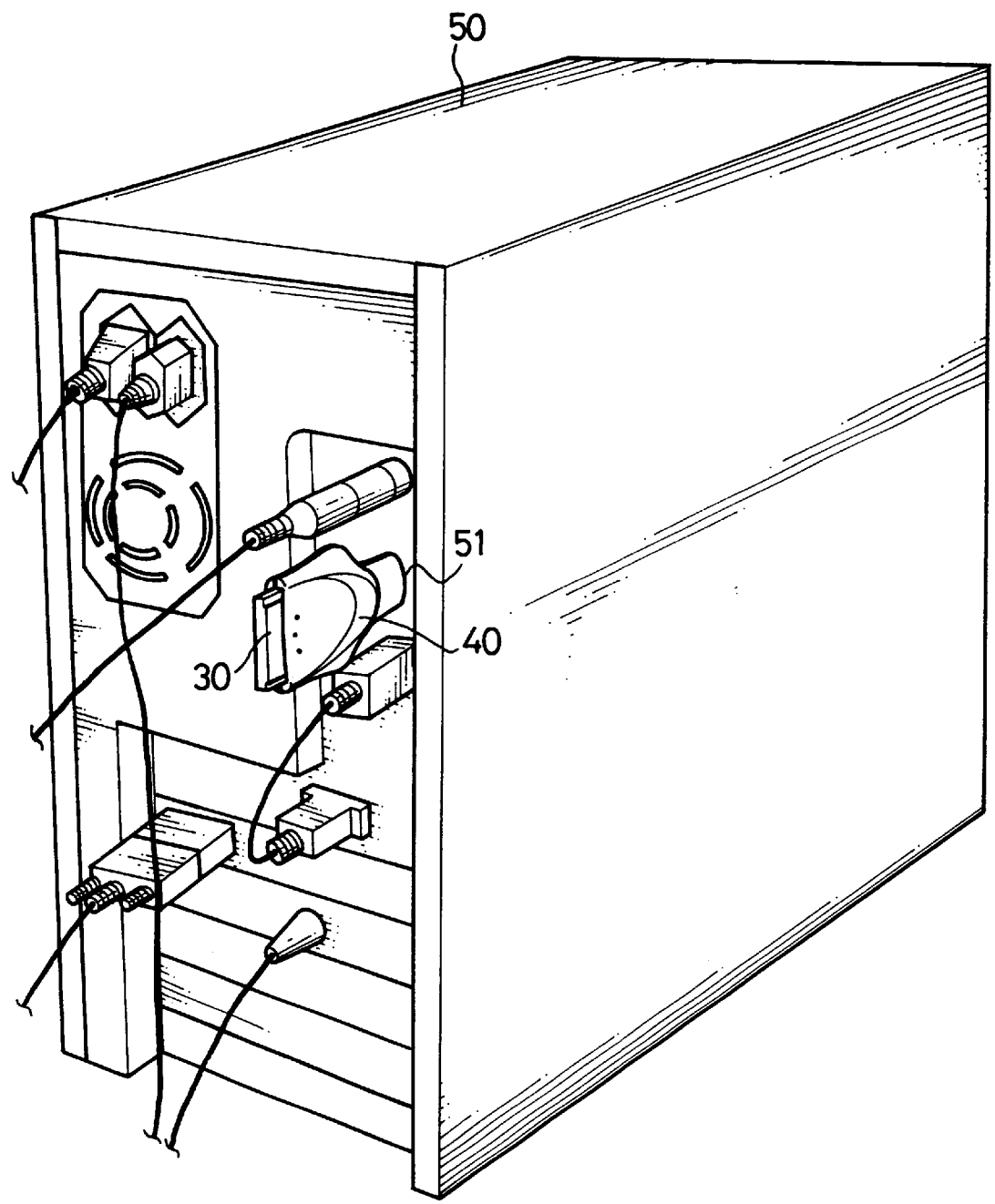
FIG. 6 schematically illustrates the use of the adapter module to connect the memory card to a computer.
Figure 7:
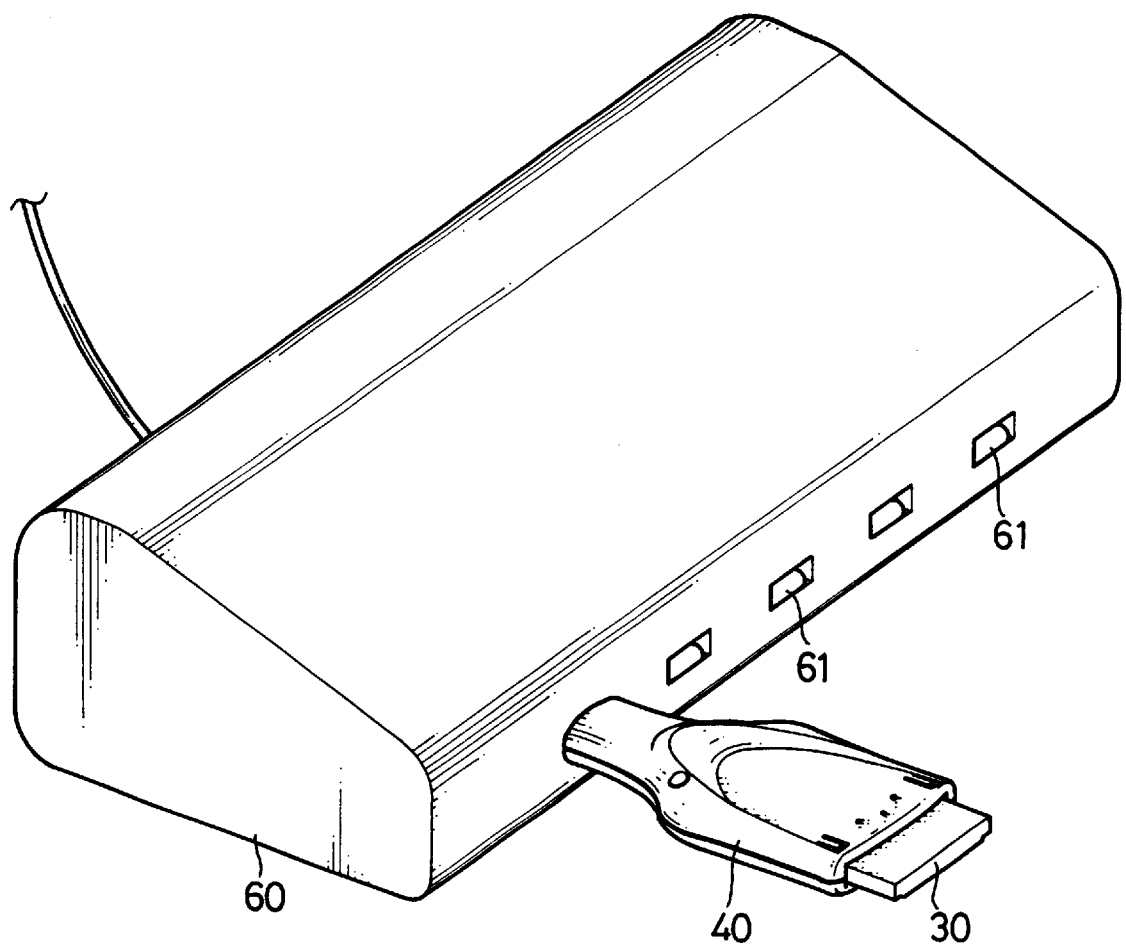
FIG. 7 schematically illustrates the use of the adapter module to connect the memory card to a hub.

With reference to FIG. 6, when USB connector (44) of the adapter module (40) is inserted into a USB slot (51) of the computer (50), the memory card (30) inside the adapter module (40) is thus connected to the computer (50) via such a USB interface arrangement. Because the memory card (30) communicates with the computer (50) via the high speed USB interface (101), the data transfer between the memory card (30) and the computer (50) is fast. Accordingly, the computer (50) can read data from or write data to the memory card (30) in a fast and convenient manner.

In addition to directly inserting the adapter module (40) into the USB slot (51) of the computer (50), the adapter module (40) can be inserted into the USB slot (61) of a hub (60) that is further connected to the computer (50).

The above description depicts the dual interface memory card and the adapter module in accordance with the present invention. It is appreciated that such a design can be applied to the existing STONE card, Smart Media card, MMC card, Memory Stick card, Compact Flash card, and the like. Consequently, it is convenient to use a computer to read data from or write data to different kinds of memory cards.

Although the present invention has been explained in relation to its preferred embodiment, it is to be understood that many other possible modifications and variations can be made without departing from the spirit and scope of the invention as hereinafter claimed.

What is claimed is:

1. A dual interface memory card (30) having a memory unit (20) and a micro control unit (10) connected to said memory unit (20), wherein said micro control unit (10) comprises:

a USB interface (101) adapted for connecting to a computer (50) whereby said computer (50) is able to read data from and write data to said memory unit (20), and a host interface (102) adapted for connecting to an electronic product which has said memory card (30) installed therein such that data output from said electronic product can be stored in said memory unit (20).

2. The dual interface memory card (30) as claimed in claim 1, wherein said micro control unit (10) further comprises:

a micro controller (11) having associated firmware to selectively process data input to said micro control unit (10) and data to be output;

a USB controller (13) for providing said USB interface (101), said USB controller (13) being connected to said memory unit (20) and said micro controller (11), such that data stored in said memory unit (20) can be transformed to USB formatted data for being output; and a host interface controller (14) for providing said host interface (102), said host interface controller (14) being connected to said memory unit (20) and said micro controller (11), such that data from said electronic product can be processed and stored in said memory unit (20).

3. The dual interface memory card (30) as claimed in claim 2, wherein said memory unit (20) is composed of flash memories.

4. The dual interface memory card (30) as claimed in claim 2, wherein said memory unit (20) is composed of read only memories.

5. An adapter module (40) for a dual interface memory card (30) having a front end formed thereon an interface port (31) for providing a USB interface (101) and a host interface (102), said adapter module (40) comprising:

a housing defining a memory card slot (45) for receiving said memory card (30);

a USB connector (44) hold in said housing and adapted for being inserted into a USB slot (51) of a computer (50); and a terminal seat (43) hold in said housing, said terminal seat (43) having a plurality of connection terminals (431), each having one end for facing to said interface port (31) of said memory card (30), and another end connected to said USB connector (44).

6. The adapter module (40) as claimed in claim 5, wherein said housing is composed of an upper shell (41) and a lower shell (42), said lower shell (42) defining two recess areas (421,422) in an upper face thereof, and said upper shell (41) defining two corresponding recess areas in a lower face thereof facing to said two recess areas (421,422), respectively, thereby defining two chambers in said housing, one being used to hold said terminal seat (43) and the other one being used to hold said USB connector (44).

7. The adapter module (40) as claimed in claim 5, wherein said terminal seat (43) is of an H-shaped body which has two parallel rims (433) and a rib (432) connected to said two rims (433), each rim (433) defining a sliding slot (430) in an inner side thereof, said plurality of connection terminals (431) being extended through said rib (432).

* * * * *